(12) United States Patent
Lu

(10) Patent No.: US 9,911,417 B2
(45) Date of Patent: Mar. 6, 2018

(54) INTERNET OF THINGS SYSTEM WITH VOICE-CONTROLLED FUNCTIONS AND METHOD FOR PROCESSING INFORMATION OF THE SAME

(71) Applicant: Tai-An Lu, New Taipei (TW)

(72) Inventor: Tai-An Lu, New Taipei (TW)

(*) Notice: Subject to any disclaimer, the term of this patent is extended or adjusted under 35 U.S.C. 154(b) by 77 days.

(21) Appl. No.: 15/089,228

(22) Filed: Apr. 1, 2016

(65) Prior Publication Data

US 2017/0287477 A1    Oct. 5, 2017

(51) Int. Cl.
| | |
|---|---|
| G10L 15/00 | (2013.01) |
| G06F 3/16 | (2006.01) |
| G10L 15/22 | (2006.01) |
| H04L 29/08 | (2006.01) |
| H04H 20/16 | (2008.01) |
| H04W 4/00 | (2018.01) |
| H04W 12/06 | (2009.01) |
| G10L 21/0208 | (2013.01) |
| H04W 88/16 | (2009.01) |

(52) U.S. Cl.
CPC .......... *G10L 15/22* (2013.01); *G10L 21/0208* (2013.01); *H04H 20/16* (2013.01); *H04L 67/12* (2013.01); *H04W 4/008* (2013.01); *H04W 12/06* (2013.01); *G10L 2015/223* (2013.01); *H04W 88/16* (2013.01)

(58) Field of Classification Search
CPC ... G10L 15/00; G10L 15/265; G10L 2015/00; A63F 13/00; H04M 3/4936; B60R 16/0373; G01C 21/3608; G06F 3/16

USPC ..................... 704/270, 270.1, 275
See application file for complete search history.

(56) References Cited

U.S. PATENT DOCUMENTS

| | | | | |
|---|---|---|---|---|
| 2001/0041982 | A1* | 11/2001 | Kawasaki | G10L 15/26 704/275 |
| 2003/0061033 | A1* | 3/2003 | Dishert | G08C 19/28 704/201 |
| 2003/0187659 | A1* | 10/2003 | Cho | H04L 12/282 704/275 |
| 2006/0004743 | A1* | 1/2006 | Murao | H04N 7/17318 |
| 2008/0154610 | A1* | 6/2008 | Mahlbacher | G08C 17/02 704/275 |
| 2009/0112602 | A1* | 4/2009 | Alfred | H04L 12/2818 704/273 |
| 2009/0204410 | A1* | 8/2009 | Mozer | G10L 15/30 704/275 |

(Continued)

*Primary Examiner* — Paras D Shah
(74) *Attorney, Agent, or Firm* — patenttm.us

(57) ABSTRACT

An internet of things (IOT) system includes an IOT server and multiple IOT devices and a voice-controlled device connected to the IOT server and the multiple IOT devices. The voice-controlled device receives a voice-controlled message of environmental sound information through a voice control interface, and broadcasts the voice-controlled message to neighboring IOT devices to drive a corresponding IOT device according to the voice-controlled message. When failing to recognize the voice-controlled message, the voice control interface uploads the voice-controlled message to a cloud server for query through the IOT server, and broadcasts a result of the query returned from the cloud server. A way of chain broadcasting is employed by the voice-controlled device to drive selected IOT device or receive returned information so as to enhance operational convenience in using IOT devices.

3 Claims, 5 Drawing Sheets

(56) References Cited

U.S. PATENT DOCUMENTS

| | | | | |
|---|---|---|---|---|
| 2009/0239587 A1* | 9/2009 | Negron | G06F 3/04883 | 455/566 |
| 2010/0151825 A1* | 6/2010 | Millet Sancho | G08C 17/02 | 455/411 |
| 2013/0061033 A1* | 3/2013 | Kim | G06F 15/7842 | 713/100 |
| 2013/0183944 A1* | 7/2013 | Mozer | H04L 12/282 | 455/414.1 |
| 2014/0098247 A1* | 4/2014 | Rao | H04W 4/20 | 348/207.1 |
| 2014/0149118 A1* | 5/2014 | Lee | G10L 15/22 | 704/251 |
| 2014/0169795 A1* | 6/2014 | Clough | G06F 19/3418 | 398/106 |
| 2014/0188463 A1* | 7/2014 | Noh | G10L 15/00 | 704/201 |
| 2015/0154976 A1* | 6/2015 | Mutagi | H04L 12/281 | 704/275 |
| 2015/0243287 A1* | 8/2015 | Nakano | G10L 15/30 | 704/246 |
| 2016/0005404 A1* | 1/2016 | Yokoya | H04N 21/233 | 704/275 |
| 2016/0134767 A1* | 5/2016 | Yu | H04N 1/00244 | 348/207.11 |
| 2016/0284350 A1* | 9/2016 | Yun | G10L 15/22 | |
| 2016/0330040 A1* | 11/2016 | Jeon | G06F 3/0481 | |

* cited by examiner

INTERNET OF THINGS SYSTEM WITH VOICE-CONTROLLED FUNCTIONS AND METHOD FOR PROCESSING INFORMATION OF THE SAME

BACKGROUND OF THE INVENTION

1. Field of the Invention

The present invention relates to an Internet of Things (IOT) system and, more particularly, to an IOT system with voice-controlled functions and a method for processing information of the same.

2. Description of the Related Art

Owing to diversified and constantly changing technological development, IOT-related technology has been flourishing over recent years and applications thereof have spread over a wide range. The primary concern of using IOT is to share information provided from IOT devices through the Internet based on a common format or standard for all systems connected to the Internet to communicate with each other and exchange information. Therefore, information available to reference and analysis of those systems connected to the Internet is not limited to a single source.

The IOT architecture is divided into three layers, which are perception layer, network layer and application layer. The perception layer includes radio frequency identification (RFID) sensors, RFID tags, sensor gateways, sensor nodes, IOT gateways, smart terminals and the like to perceive and monitor according to different scenarios. The perception layer includes equipment capable of sensing, recognizing and communicating. The network layer includes cloud computing platforms, mobile communication networks, the Internet, information centers, network management centers and the like to transmit information collected from the perception layer to the Internet. Telecommunication networks for voice communication and data communication networks for data communication can be built on a wireless communication network. The application layer includes telemedicine, monitoring of logistics, intelligent transportation, pollution control, intelligent home, smart power grid, smart meter and the like to combine technology of IOT with that of other industries and develop application software corresponding to different demands.

Despite a high prevalence of IOT technology, noise-cancelling functions of voice systems applied to IOT in the market are still behind user's expectation and can only provide limited default standardized voice commands. However, when the voice recognition capability is insufficient conventionally, efficiency of data communication through IOT and capability of recognizing different IOT devices may suffer from the insufficiency in voice recognition.

SUMMARY OF THE INVENTION

An objective of the present invention is to provide a method for processing information of an internet of things (IOT) system with voice-controlled functions to manage communication status and interaction between any two of multiple IOT devices, wirelessly transmit recognized voice content through a one-to-many broadcasting manner to transmit a message to a designated device for execution of specific command, and drive the selected IOT device or acquire returned information in a way of chain broadcasting to enhance operational convenience.

To achieve the foregoing objective, the method for processing information of an IOT system with voice-controlled functions is performed by an IOT system having a voice-controlled device, multiple IOT devices and an IOT server and comprises a voice-controlled device mode. The voice-controlled device mode is performed by the voice-controlled device and comprises steps of:

collecting environmental sound information;

filtering out noise in the environmental sound information to leave a voice-controlled message, wherein the voice-controlled message includes a piece of device tag information, a piece of command tag information and a piece of authentication tag information; and broadcasting the voice-controlled message to the multiple IOT devices to drive a corresponding IOT device according to the voice-controlled message.

Preferably, the method further comprises an IOT device mode. The IOT device mode is performed by each IOT device and comprises steps of:

receiving the voice-controlled message transmitted from the voice-controlled device; and performing a control action corresponding to the voice-controlled message and returning a completion message to the voice-controlled device.

Given the foregoing method, the goal of broadcasting the voice-controlled message to neighboring IOT devices to drive the selected IOT device through a way of chain broadcasting, receiving the voice-controlled message transmitted from the voice-controlled device, performing corresponding control action, and returning the completion message to the voice-controlled device through the IOT system can be achieved, thereby enhancing operational convenience of IOT devices to be used.

To achieve the foregoing objective, the IOT system with voice-controlled functions include at least one IOT device, an IOT server and a voice-controlled device.

The IOT server is connected to a network and the at least one IOT device.

The voice-controlled device is connected to the network and the at least one IOT device and has a voice control interface for receiving and uttering sound. The voice control interface collects environmental sound information, filters out noise in the environmental sound information to leave a voice-controlled message, and broadcasts the voice-controlled message to the at least one IOT device to drive a corresponding IOT device according to the voice-controlled message. When receiving the voice-controlled message, the corresponding IOT device performs a control action corresponding to the voice-controlled message and returns a completion message to the voice control interface. When failing to recognize the voice-controlled message, the voice control interface uploads the voice-controlled message to a cloud server for query through the IOT server.

Given the foregoing IOT system, the voice-controlled device receives the voice-controlled message in the environmental sound information through the voice control interface and broadcasts the voice-controlled message to neighboring IOT devices to drive a corresponding IOT device according to the voice-controlled message, when failing to recognize the voice-controlled message, the voice control interface uploads the voice-controlled message to a cloud server for query through the IOT server and broadcasts according to a result of the query returned from the cloud server. As a way of chain broadcasting is applied to drive the selected IOT device or receive returned information, the operational convenience in using IOT devices can thus be enhanced.

DETAILED DESCRIPTION OF THE INVENTION

Figure 1:
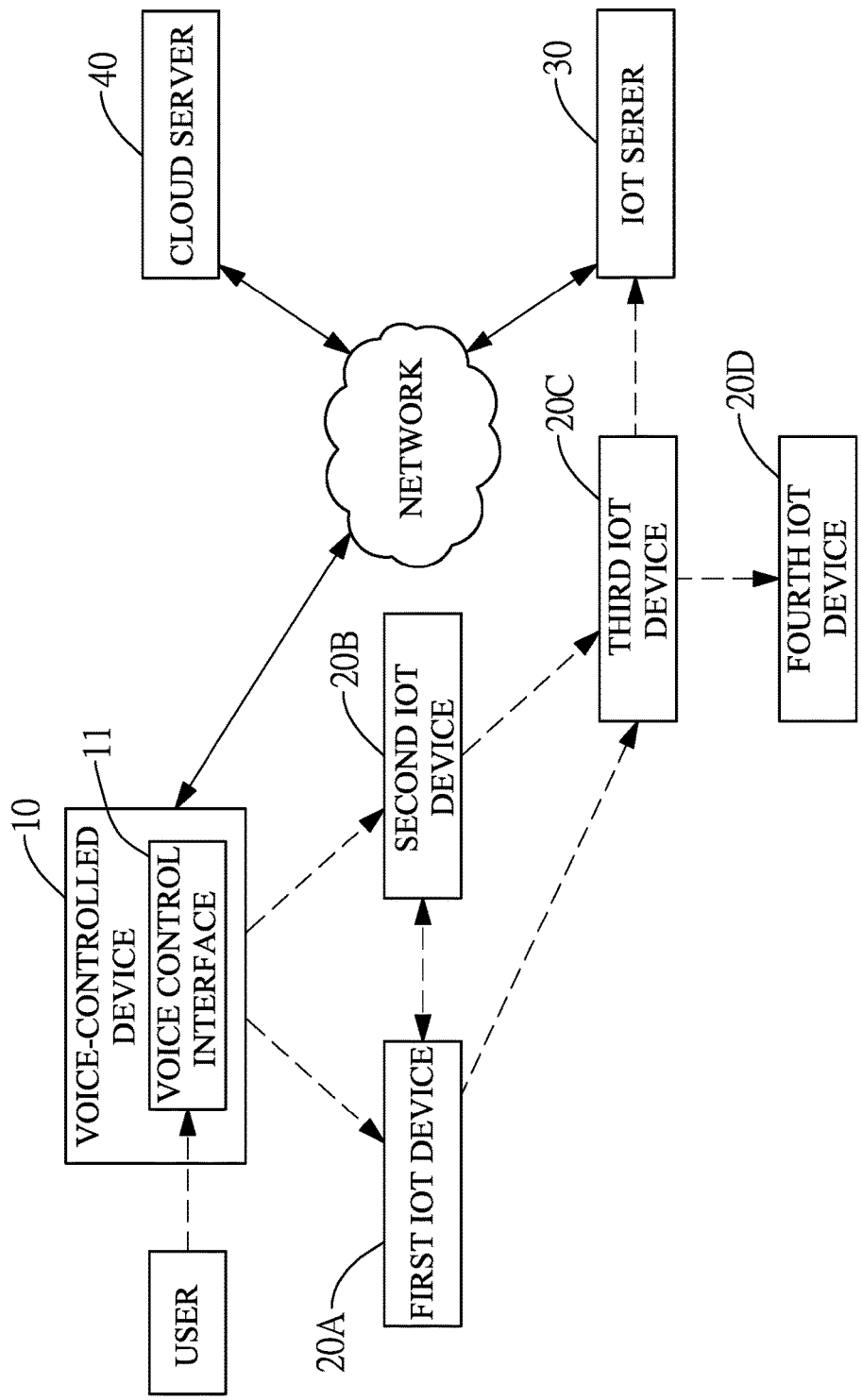
FIG. 1 is a functional block diagram showing architecture of an IOT system with voice-controlled functions in accordance with the present invention.
Figure 2:
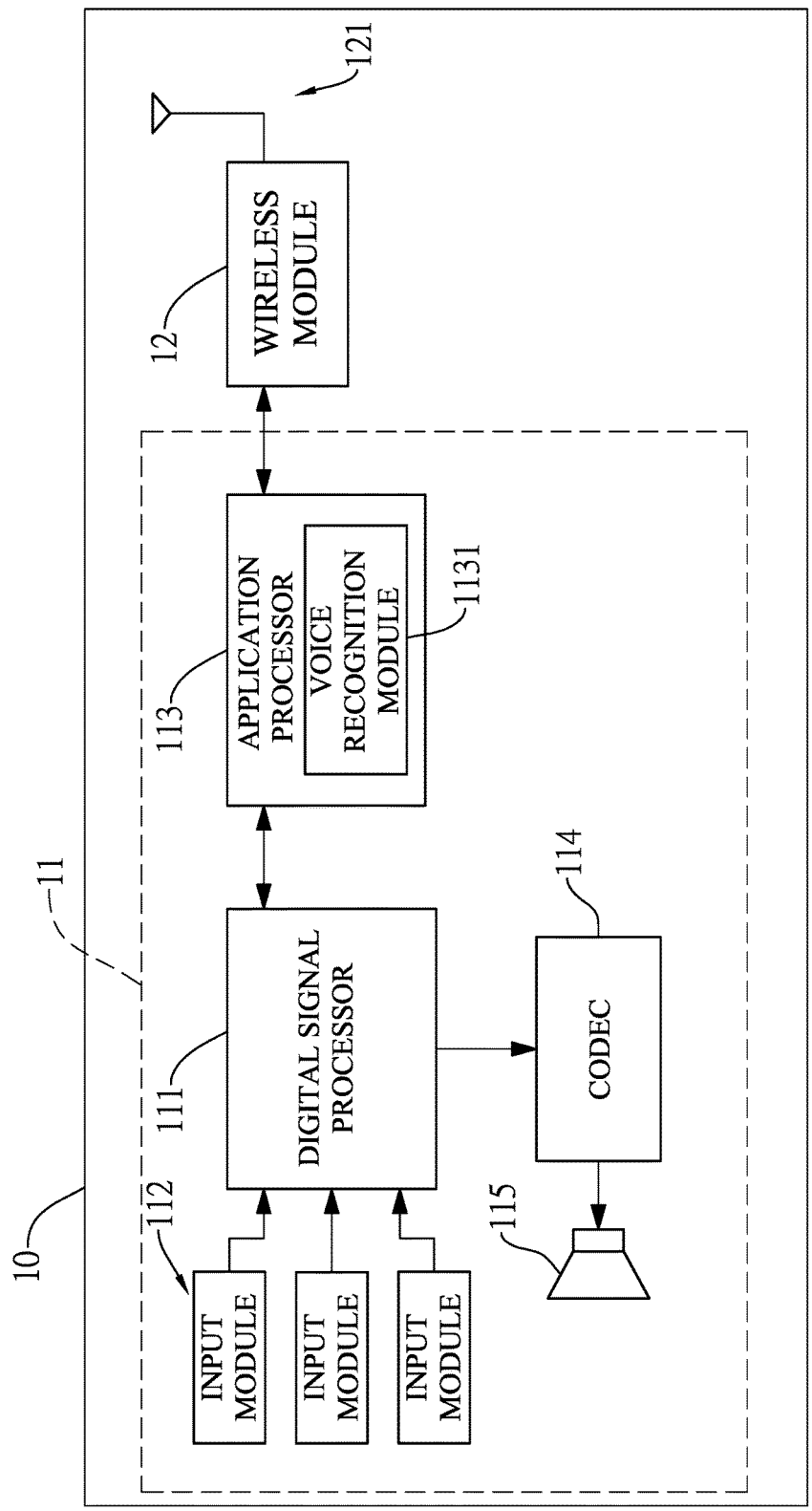
FIG. 2 is a functional block diagram of a voice-controlled device of the IOT system in FIG. 1.

With reference to FIGS. 1 and 2, an internet of things (IOT) system with voice-controlled functions in accordance with the present invention includes a voice-controlled device 10, multiple IOT devices and an IOT server 30. The IOT server 30 is connected to a network and the multiple IOT devices. The voice-controlled device 10 is also connected to the network and the multiple IOT devices and has a voice control interface 11 for receiving and uttering sound. In the present embodiment, the IOT system further includes a cloud server 40 to exchange information through the network and the IOT server 30.

The multiple IOT devices include a first IOT device 20A, a second IOT device 20B, a third IOT device 20C and a fourth IOT device 20D, which exchange information wirelessly and receive information transmitted from the voice-controlled device 10. When the voice-controlled device 10 approaches the first IOT device 20A and the second IOT device 20B, the first IOT device 20A and the second IOT device 20B can transmit received information to the third IOT device 20C and the fourth IOT device 20D that are farther away than the first IOT device 20A and the second IOT device 20B. Then, the third IOT device 20C or the fourth IOT device 20D further transmits information to the IOT server 30. Moreover, the IOT server 30 may transmit information to the cloud server 40 through the network.

When a user speaks to the voice-controlled device 10 in an environment, the voice control interface 11 of the voice-controlled device 10 collects environmental sound information, filters noise in the environmental sound information to generate a voice-controlled message, and broadcasts the voice-controlled message to at least one of the multiple IOT devices, such as the second IOT device 20B, to drive one of the multiple IOT devices corresponding to the voice-controlled message, such as the third IOT device 20C. After receiving the voice-controlled message, the corresponding IOT device, such as the third IOT device 20C, performs a corresponding control action according to the voice-controlled message and returns a completion message to the voice control interface 11 of the voice-controlled device 10. When failing to recognize the voice-controlled message, the voice control interface 11 of the voice-controlled device 10 uploads the voice-controlled message to the cloud server 40 through the IOT server 30 for further recognition. Given the way of broadcasting one voice-controlled message to the multiple IOT devices, the IOT server 30 and the cloud server 40 can monitor and control communication status of the voice-controlled message and mutual interaction of the multiple IOT devices.

With reference to FIG. 2, the voice-controlled device 10 further includes a wireless module 12 connected to the voice control interface 11 and transceiving signals through a first antenna 121. The voice control interface 11 includes a digital signal processor 111, at least one input module 112, an application processor 113, a codec (Coder-Decoder) 114 and a speaker module 115. The digital signal processor 111 is connected to the at least one input module 112, the application processor 113 and the codec 114. The codec 114 is connected to the speaker module 115 to play a sound. The application processor 113 is connected to the wireless module 12 to process received voice messages or voice messages to be transmitted. In the present embodiment, the application processor 113 is built in with a voice recognition module 1131 to recognize a specific message contained in the voice messages and provide a noise-cancelling function. The voice-controlled device 10 further includes multiple input modules 112 and each input module 112 may be a microphone.

Figure 3:
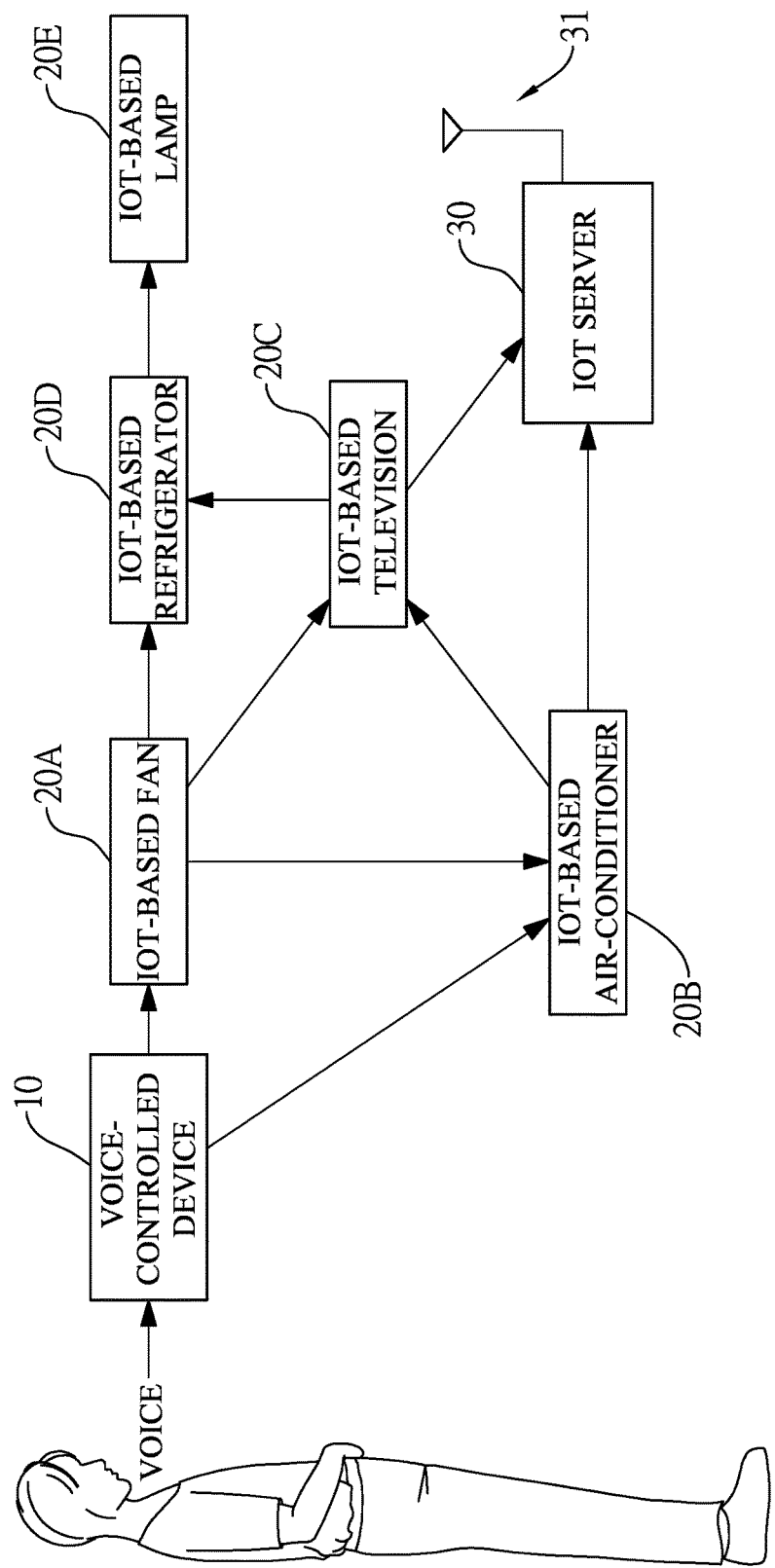
FIG. 3 is a schematic diagram showing applications of the IOT system in FIG.
Figure 4:
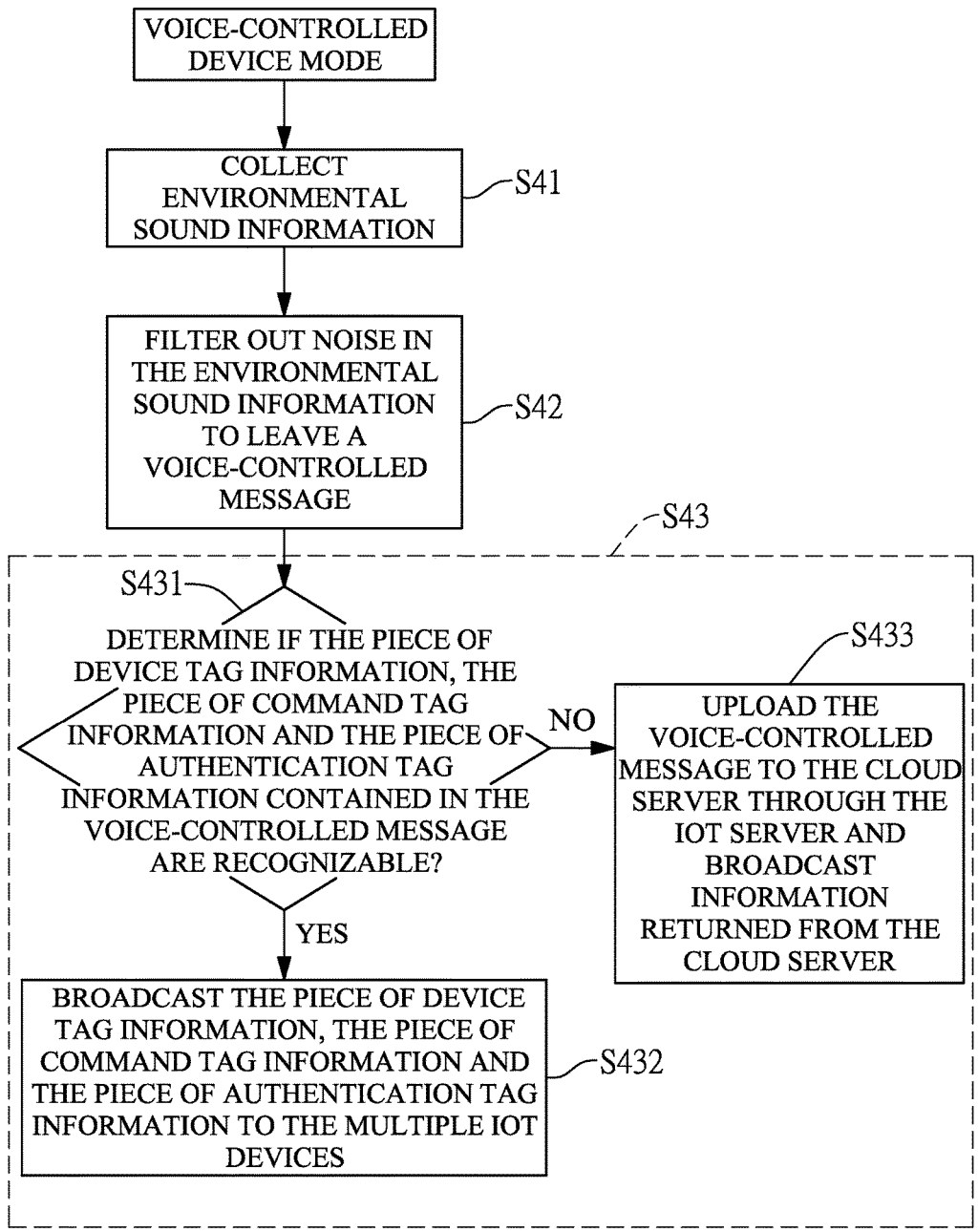
FIG. 4 is a flow diagram showing a voice-controlled mode of a method for processing information of the IOT system in FIG. 1.
Figure 5:
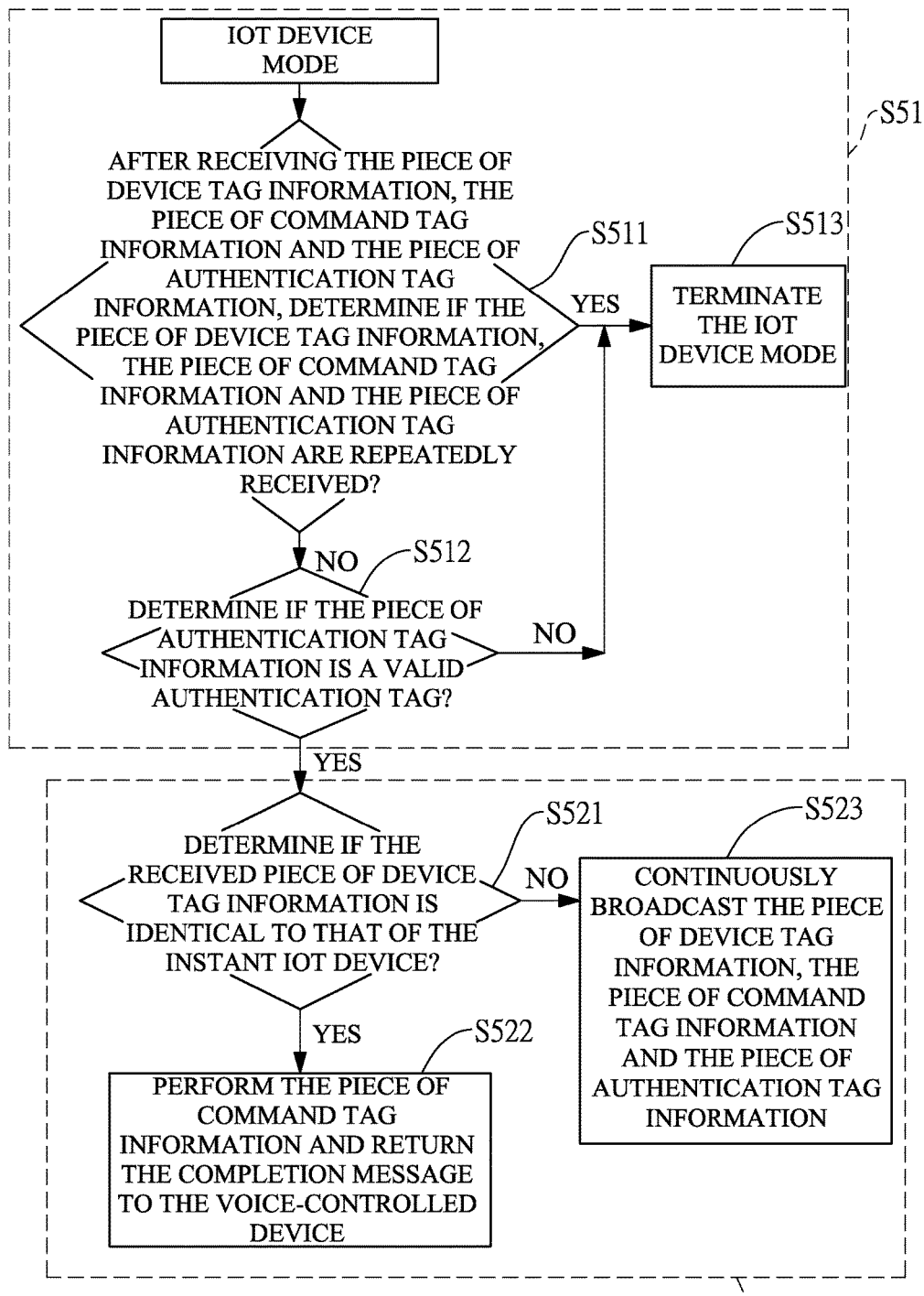
FIG. 5 is a flow diagram showing an IOT mode of the method in FIG. 4.

To depict applications of the IOT system with voice-controlled functions, with reference to FIGS. 2 and 3, the first IOT device 20A is an IOT-based fan, the second IOT device 20B is an IOT-based air-conditioner, the third IOT device 20C is an IOT-based television, the fourth IOT device 20D is an IOT-based refrigerator, the fifth IOT device 20E is an IOT-based lamp, and the IOT server 30 is connected to a network through a second antenna 31.

Users can speak to the voice-controlled device 10 to utter a sound. After the voice-controlled device 10 collects the environmental sound information using the multiple input modules 112, such as multiple microphones, and the digital signal processor 111 filters out background noise in the environmental sound information to leave a clean voice-controlled message without the background noise and transmits the clean voice-controlled message to the application processor 113. In the present embodiment, the voice recognition module 1131 built in the application processor 113 further recognizes the clean voice-controlled message as a piece of device tag information, a piece of command tag information and a piece of authentication tag information representative of an IOT system. When users utter words of "turning on the lamp", "the lamp" is the piece of device tag information, and "turning on" is the piece of command tag information. For example, the voice recognition module 1131 is built in with multiple pieces of device tag information and corresponding pieces of command tag information, the multiple pieces of device tag information include a piece of lamp information (e.g. string "0001"), a piece of fan information (e.g. string "0010"), a piece of television information (e.g. string "0011"), a piece of air-conditioner information (e.g. string "0100"), and a piece of refrigerator information (e.g. string "0101"), and the pieces of command tag information corresponding to the piece of lamp information include a piece of turn-off information (e.g. string "0000") and a piece of turn-on information (e.g. string "0001"). When users finish the saying "turn off the lamp" that is then processed by the voice control interface 11, the application processor 113 will acquire the piece of lamp information (e.g. string "0001"), the corresponding piece of turn-on information (e.g. string "0001") and the corresponding piece of authentication tag information (e.g. string "1000"). The application processor 113 then broadcasts a voice-controlled message with a set of strings "0001 0001 1000" to one of the multiple IOT devices through the wireless module 12.

When receiving the voice-controlled message, the IOT device performs a corresponding control action according to the voice-controlled message and returns a completion message to the voice control interface 11 of the voice-controlled device 10. When failing to recognize the voice-controlled message, the voice control interface 11 of the voice-controlled device 10 uploads the voice-controlled message to the cloud server 40 for query through the IOT server 30. For example, when users say "how is the weather in Taipei today", no matching pieces of device tag information and command tag information pre-configured in the voice recognition module 1131 can be found, the application processor 113 then records a clean voice-controlled message and sends the clean voice-controlled message to the IOT server 30, the IOT server 30 further sends the clean voice-controlled message to the cloud server 40, such as the search engines associated with Google® and Baidu®, and information acquired from the search engines is sent back to the voice-controlled device 10 for the speaker module 115 to tell the users about information relevant to the weather today in Taipei.

With reference to FIG. 3, when users say "turn on the lamp", the voice-controlled device 10 broadcasts such voice-controlled message sequentially through the IOT-based fan, the IOT-based refrigerator and the IOT-based lamp. After being turned on, the IOT-based lamp transmits the completion message back to the voice-controlled device 10 sequentially through the IOT-based refrigerator and the IOT-based fan for the speaker module 115 to utter sound for the completion message. When users say "how is the weather in Taipei today", the voice-controlled device 10 broadcasts such a voice-controlled message sequentially through the IOT-based fan and the IOT-based television or sequentially through the IOT-based air-conditioner and the IOT server 30 for the IOT server 30 to upload the voice-controlled message to a search engine to acquire a corresponding answer to the voice-controlled message. The IOT server 30 further transmits the answer back to the voice-controlled device 10 for the speaker module 115 to tell the users about the weather today in Taipei. When the voice-controlled device 10 repeatedly receives same information within a preset time, the repeated information will be ignored.

A method for processing information of an IOT system with voice-controlled functions can be induced according to description of the foregoing embodiment, is performed by an IOT system with voice-controlled functions, and provides a voice-controlled device mode performed by the voice-controlled device 10. The voice-controlled device mode includes the following steps.

Step S41: Collect environmental sound information.

Step S42: Filter out noise in the environmental sound information to leave a voice-controlled message. The voice-controlled message includes a piece of device tag information, a piece of command tag information and a piece of authentication tag information.

Step S43: Broadcast the voice-controlled message to the multiple IOT devices to drive a corresponding IOT device according to the voice-controlled message.

Step S43 further includes the following sub-steps.

Step S431: Determine if the piece of device tag information, the piece of command tag information and the piece of authentication tag information contained in the voice-controlled message are recognizable. If positive, perform step S432. Otherwise, perform step S433.

Step S432: Broadcast the piece of device tag information, the piece of command tag information and the piece of authentication tag information to the multiple IOT devices.

Step S433: Upload the voice-controlled message to the cloud server 40 through the IOT server 30 and broadcast information returned from the cloud server 40.

The foregoing method targets at broadcasting the voice-controlled message to the multiple IOT devices to drive a corresponding IOT device according to the voice-controlled message in a way of chain broadcasting, and further provides an IOT device mode performed by each IOT device. The IOT device mode includes the following steps.

Step S51: Receive the voice-controlled message transmitted from the voice-controlled device 10.

Step S52: Perform a control action corresponding to the voice-controlled message and return a completion message to the voice-controlled device 10.

Step S51 further includes the following sub-steps:

Step S511: After receiving the piece of device tag information, the piece of command tag information and the piece of authentication tag information, determine if the piece of device tag information, the piece of command tag information and the piece of authentication tag information are repeatedly received. If positive, perform step S513. Otherwise, perform step S512.

Step S512: Determine if the piece of authentication tag information is a valid authentication tag. If positive, perform step S52. Otherwise, perform step 513.

Step S513: Ignore the piece of device tag information, the piece of command tag information and the piece of authentication tag information and then terminate the IOT device mode.

Step S52 further includes the following sub-steps.

Step S521: Determine if the received piece of device tag information is identical to that of the instant IOT device. If positive, perform step S522. Otherwise, perform step S523.

Step S522: Perform the piece of command tag information and return the completion message to the voice-controlled device 10.

Step S523: Continuously broadcast the piece of device tag information, the piece of command tag information and the piece of authentication tag information to other IOT devices.

Given the foregoing IOT system and method, after receiving the voice-controlled message, the IOT devices then perform corresponding control actions and return the completion message to the voice-controlled device 10, such that the way of chain broadcasting is employed to drive the IOT device designated by users and instant awareness of communication status and interaction between any two IOT devices enhances operational convenience in using IOT devices through the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for processing information of an Internet of things (IOT) system with voice-controlled functions, wherein the method is performed by an IOT system having a voice-controlled device, multiple IOT devices and an IOT server and comprises a voice-controlled device mode and an IOT device mode, wherein the voice-controlled device mode is performed by the voice-controlled device and comprises steps of:
    collecting environmental sound information;
    filtering out noise in the environmental sound information to leave a voice-controlled message, wherein the voice-controlled message includes a piece of device tag information, a piece of command tag information and a piece of authentication tag information; and
    broadcasting the voice-controlled message to the multiple IOT devices to drive a corresponding IOT device according to the voice-controlled message; and
    the IOT device mode is performed by the corresponding IOT device and comprises steps of:
    receiving the voice-controlled message transmitted from the voice-controlled device;
    after receiving the voice-controlled message, determining if the voice-controlled message is repeatedly received;
    determining if the piece of authentication tag information of the voice-controlled message is a valid authentication tag when determining that the voice-controlled message is not repeatedly received;
    ignoring the voice-controlled message and then terminating the IOT device mode when determining that the voice-controlled message is repeatedly received or that the piece of authentication tag information of the voice-controlled message is not a valid authentication tag; and
    performing a control action corresponding to the voice-controlled message and returning a completion message to the voice-controlled device when determining that the piece of authentication tag information of the voice-controlled message is a valid authentication tag.

2. The method as claimed in claim 1, wherein the step of broadcasting the voice-controlled message to the multiple IOT devices comprises steps of:
    determining if the piece of device tag information, the piece of command tag information and the piece of authentication tag information contained in the voice-controlled message are recognizable;
    when the piece of device tag information, the piece of command tag information and the piece of authentication tag information are determined to be recognizable, broadcasting the piece of device tag information, the piece of command tag information and the piece of authentication tag information to the multiple IOT devices; and
    when the piece of device tag information, the piece of command tag information and the piece of authentication tag information are determined to be unrecognizable, uploading the voice-controlled message to a cloud server through the IOT server and broadcasting information returned from the cloud server.

3. The method as claimed in claim 1, wherein the step of performing a control action corresponding to the voice-controlled message and returning a completion message to the voice-controlled device comprises steps of:
    determining if the received piece of device tag information is identical to that of the corresponding IOT device;
    performing the piece of command tag information and returning the completion message to the voice-controlled device; and
    continuously broadcasting the piece of device tag information, the piece of command tag information and the piece of authentication tag information to other IOT devices.

\* \* \* \* \*